(12) United States Patent
Geary

(10) Patent No.: US 6,907,749 B2
(45) Date of Patent: Jun. 21, 2005

(54) EVAPORATIVE AIR COOLING ARRAY METHOD AND AN APPARATUS FOR SUPPORTING COOLING DEVICES

(76) Inventor: Kevin M. Geary, 6332 O'Bannon Dr., Las Vegas, NV (US) 89146

( * ) Notice: Subject to any disclaimer, the term of this patent is extended or adjusted under 35 U.S.C. 154(b) by 0 days.

(21) Appl. No.: 10/428,232

(22) Filed: May 5, 2003

(65) Prior Publication Data

US 2004/0221601 A1 Nov. 11, 2004

(51) Int. Cl.[7] .............................. F28D 3/00; F28D 5/00; F25D 23/12
(52) U.S. Cl. ........................... 62/259.1; 62/171; 62/314
(58) Field of Search ............................... 62/259.1, 171, 62/314, 262, 263, 175, 178, 179, 180

(56) References Cited

U.S. PATENT DOCUMENTS 4,232,531 A * 11/1980 Mangam et al. ............... 62/171
5,701,748 A * 12/1997 Phelps et al. .................. 62/91

OTHER PUBLICATIONS

Brochure, "Aerocool Inductrial Coolers Engineering Data" Phoenix Manufacturing Inc., Feb. 2003.*
Brochure, "Commerical Evaporative Air Conditioning" Breezair, Feb. 1996.*
Brochure, "Breezair EA Range" Breezair, Jul. 1998.*
Brochure, "Industrial MasterCool Direct and Indirect/Direct Evaporative Cooling" AdobeAir Inc., Jul. 2000.*

* cited by examiner

Primary Examiner—Chen Wen Jiang
(74) Attorney, Agent, or Firm—Harry M. Weiss; Weiss, Moy & Harris, P.C.

(57) ABSTRACT

An evaporative cooling method using an array of evaporative coolers and operation of this array of evaporative coolers at a low fan setting as disclosed. Also disclosed is the location of this array of evaporative coolers in such a manner as to create an optimal cooling effect within the interior of a building or home. Additionally, an apparatus is disclosed for supporting and arranging cooling devices along the outer wall of a home that bridges the gap in cut 2×4s while sustaining the weight of the evaporative cooler or the air conditioner placed upon it.

4 Claims, 2 Drawing Sheets

EVAPORATIVE AIR COOLING ARRAY METHOD AND AN APPARATUS FOR SUPPORTING COOLING DEVICES

FIELD OF THE INVENTION

The invention relates generally to an evaporative air cooling method and, more specifically, to an array of two or more evaporative coolers for enhanced cooling especially useful in the Southwest area of the United States.

BACKGROUND OF THE INVENTION

Most buildings or homes are equipped with at least one type of cooling device. Homes in the Southwest of the United States usually have either at least one evaporative cooler or air conditioner. And traditionally, the user is able to adjust the power or coolant output of the cooling device in order to achieve the desired room temperature inside the building or home.

Air conditioners were designed for use in areas of high humidity, however, they do not work cost effectively in areas of low humidity such as in the Southwest of the United States. Also, air conditioners placed on a roof of a building or dwelling lose about 25% of their efficiency because of exposure to the sun besides being very difficult to maintain because of the roof mounting. As a result, air cooling devices are preferably not mounted on roofs.

Applicant has discovered that evaporative coolers properly used and properly arranged will provide better cooling for buildings or homes in areas where there is low humidity despite high temperatures (over 100 degrees Fahrenheit). Previously, air conditioners rather than evaporative coolers were the cooling devices that people resorted to for cooling the interior of homes or buildings when the outside temperature exceeded 100 degrees Fahrenheit, even in areas of low humidity such as in the Southwestern part of the United States.

An evaporative cooler basically comprises a large fan and water-moistened pads. The outside air is cooled as it passes through the moist pads and is then blown into the building or home providing moist cooled air.

In very hot weather (over 100 degrees Fahrenheit), a user is often tempted to turn the evaporative cooling device onto its highest blower setting. Turning an evaporative cooler onto its highest blower setting, however, will not cause the interior room to cool any faster. Instead, by placing the evaporative cooler onto its highest blower setting, the outside air has less time to be cooled before it is blown into the building or home. The result is that the evaporative cooler blows warmer air at a faster rate into the building or home. Furthermore, prior to this invention, evaporative coolers were believed to be ineffective to cool interior portions of a building or home in very hot weather even in areas of low humidity.

Therefore a need existed for a method of better operating and placing evaporative coolers in such a way as to create an optimal cooling effect for interior portions of a building or home that would be especially effective in areas of low humidity even if the temperature exceeds 100 degrees Fahrenheit.

In order for the vent of the cooling device to reach, for example, the inside of a home, Applicant discovered that it is necessary for the vent to penetrate the wall on which the cooling device is mounted for more efficient and enhanced cooling. Specifically, Applicant discovered that providing an array of evaporative coolers, operated in the manner disclosed herein, that are wall mounted with wall penetrating vents provides cooled air that can more efficiently cool the interior of a building or home.

Building codes often prohibit the use of window mounted cooling devices, therefore it is preferable in the Southwest to penetrate and reinforce or provide a brace for the wall rather than mount a cooling unit on a roof in the extreme temperature and sunlight prevalent in the Southwest which destroys the efficiency of a roof mounted cooling device.

The frame of a building or home is commonly made up of 2×4 wooden studs spaced approximately sixteen inches apart. In order for the vent to penetrate the wall, at least one or often two of these 2×4s need to be cut. Cutting through these 2×4s is necessary to create the vent, but is structurally undesired because it compromises the structural integrity of the wall of the building or home.

Therefore a need also existed for an apparatus for supporting and arranging cooling devices along at least one outer wall of a building or home that bridges the gap in the cut 2×4s while sustaining the weight of the evaporative cooler or the air conditioner placed upon it thereby providing, in effect, a wall brace.

SUMMARY OF THE INVENTION

An object of the present invention is to provide an improved cooling method.

Another object of the present invention is to provide an improved cooling method which comprises placing an array of evaporative coolers in such a way and operated in such a manner as to create an optimal cooling effect.

It is another object of this invention to provide an improved cooling method which comprises providing an array of evaporative coolers with each evaporative cooler mounted on a wall of a building or home and having a vent penetrating the wall for efficient and enhanced cooling.

Another object of the present invention is to provide an apparatus for supporting and arranging cooling devices along the outer wall of a building or home that bridges the gap in each cut 2×4 while sustaining the weight of the evaporative cooler or the air conditioner placed upon it thereby providing a wall brace.

BRIEF DESCRIPTION OF THE PREFERRED EMBODIMENTS

In accordance with one embodiment of the present invention, a method for cooling the interior of a building or home using evaporative coolers comprising the steps of coupling an output of one of the at least two evaporative coolers into the interior of the building or home, controlling the output of the one of the at least two evaporative coolers by placing its control fan on a low setting, coupling an output of the other one of the at least two evaporative coolers into the interior of the building or home when the temperature within the interior of the building or home becomes uncomfortable due to high external temperature, and controlling the output of the other of the at least two evaporative coolers by placing its controls on a low fan setting, whereby an optimal cooling effect is created in the interior of the building or home. A user may turn on and control any additional evaporative cooler onto a low fan setting to create an optimal interior temperature.

In accordance with another embodiment of the present invention, an apparatus for supporting and arranging a cooling device along the outer wall of a building or home comprising in combination, a main support frame for bridging a gap caused by cutting through at least one 2×4 of a frame of the building or home in order to accommodate a vent of the cooling device, a base for supporting the cooling device extending horizontally from and connected to the main support frame, and means for connecting the main support frame to a top portion of the at least one 2×4 above the gap to a portion of the at least one 2×4 below the gap thereby having the main support frame serving to both support the cooling device and bridge the gap between the at east one 2×4 to support the cut 2×4. In order to support the cooling device while bridging the gap caused by cutting through at least two 2×4s of a frame of a building or home in order to accommodate the vent of the cooling device, the main support frame has a substantially middle rung traversing widthwise across the frame's rectangular configuration, the base extends horizontally from the middle rung of the main support frame, and at least two support rungs extend downwardly at an angle from the rectangular configuration of the base into contact with portions of the rectangular configuration of the main support frame for supporting the base.

The foregoing and other objects, features, and advantages of the invention will be apparent from the following, more detailed description of the preferred embodiments of the invention, as illustrated in the accompanying drawings.

DETAILED DESCRIPTION OF THE PREFERRED EMBODIMENTS

Figure 1:
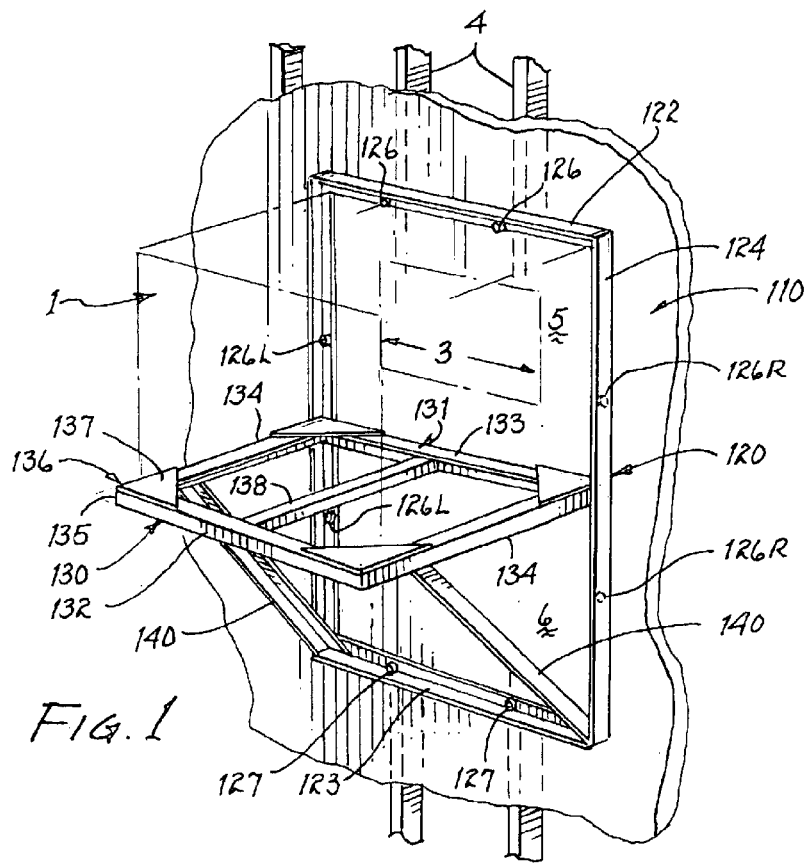
FIG. 1 is a perspective view of the preferred support apparatus embodiment of the present invention, shown coupled to two cut 2×4s of the frame of a building or home (shown in phantom) and with a cooling device (i.e. evaporative cooler) in place thereon (also shown in phantom).
Figure 3:
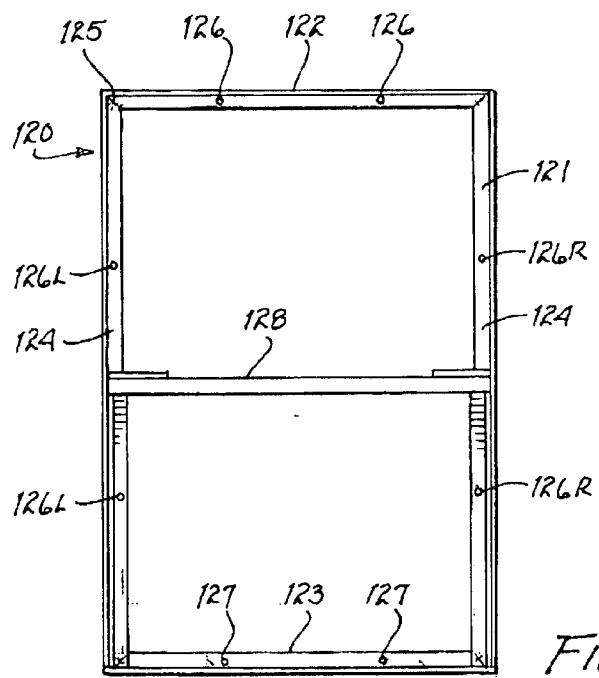
FIG. 3 is a front view of the frame of the apparatus of FIG. 1.
Figure 2:
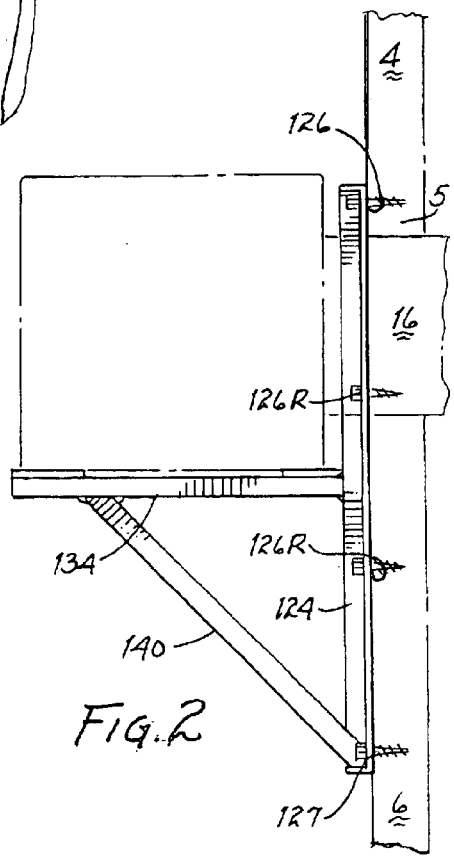
FIG. 2 is a side view of the support apparatus of FIG. 1, shown connected to the cut 2×4s of the frame of a building or home and with a cooling device positioned thereon.

FIGS. 1–3 refer to the preferred embodiment of the invention. They show a support apparatus 110 for supporting and arranging, for example, evaporative cooling devices 1 along the outer wall 2 (see FIG. 4) of a home. The apparatus 110 comprises a main support frame 120 for bridging each gap 3 caused by cutting through at least one or two 2×4s 4 of a frame of a home 7 (see FIG. 4) in order to accommodate a vent 16 (see FIG. 2) of the cooling device 1. These cut 2×4s 4 each have a top severed end 5 and a bottom severed end 6. The main support frame 120 has a substantially rectangular configuration 121 (see FIG. 2) and a middle rung 128 traversing widthwise across the rectangular configuration 121. The apparatus 120 also has a base 130 extending horizontally from the middle rung 128 of the main support frame 120. Similarly, the base 130 has a substantially rectangular configuration 131 and a middle rung 138 traversing widthwise across the rectangular configuration 131. The apparatus 110 also has at least two support rungs 140 extending downwardly at an angle from the rectangular configuration 131 of the base 130 into contact with the rectangular configuration 121 of the main support frame 120 for stabilizing and supporting the base 130.

The rectangular configuration 121 of the main support frame 120 further comprises a short top edge 122, a short bottom edge 123, and two long side edges 124 (see FIG. 3), which together create four corners 125. The rectangular configuration 131 of the base 130 further comprises a long front edge 132, a long back edge 133, and two short side edges 134 (see FIG. 1), creating four corners 135. The base 130 further comprises four corner supports 136 coupled to the corresponding four corners 135 of the rectangular configuration 134 for providing flat surfaces 137 onto which the cooling device 1 may be set.

The short top edge 122 of the main support frame 120 preferably has at least two holes 126 for screwing (by means of long sturdy screws shown in FIG. 2) the main support frame 120 onto the two top severed ends 5 of the two cut 2×4s 4. The short bottom edge 123 of the main support frame 120 preferably has at least two holes 127 for screwing (by means of long sturdy screws shown in FIG. 2) the main support frame 120 onto the two bottom severed ends 6 of the cut 2×4s 4. Preferably, two additional screw holes 126R and 126L are respectively provided (two for each side) on the two long side edges 124 to permit screws to be inserted therein to attach to the wall behind the two long side edges 124 to provide increased support for the support apparatus 110 and any cooling device 1 to be supported by the support apparatus 110. And the support rungs 140 each abut one of the short side edges 134 of the base 130 and the short bottom edge 123 of the main support frame 120.

Statement of Operation

Figure 4:
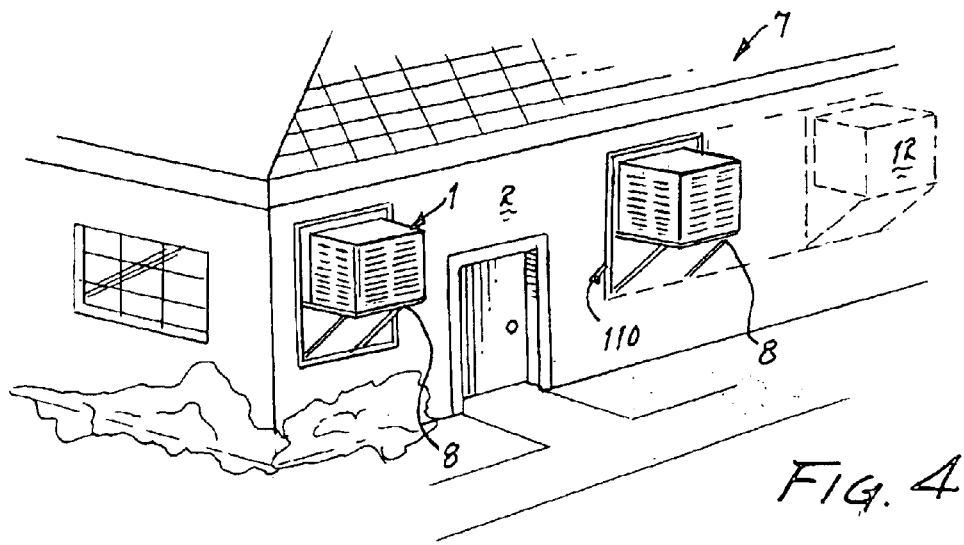
FIG. 4 is a perspective view of the outer wall of a home, shown with two of the support apparatus of FIG. 1 and their corresponding evaporative coolers in place thereon and with a third support apparatus and corresponding evaporative cooler (shown in phantom).
Figure 5:
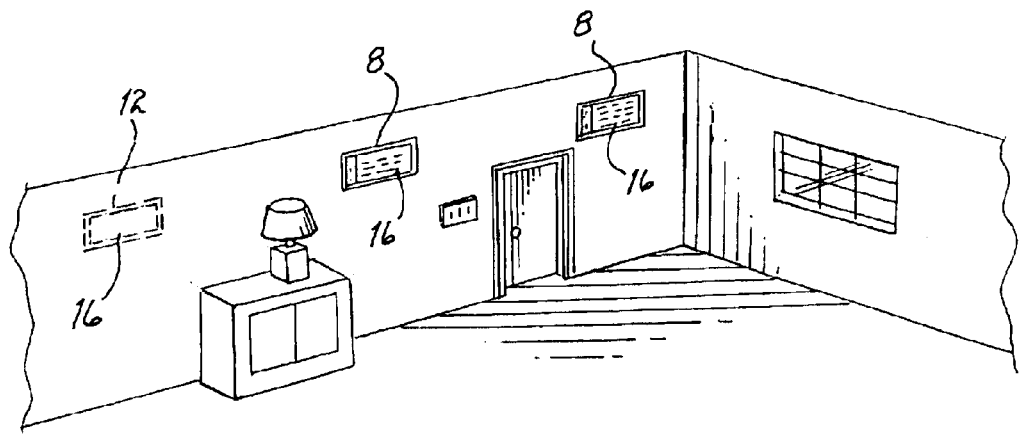
FIG. 5 is a perspective view of the inside wall of a home, shown with the vents of two evaporative coolers in place and with a third vent (in phantom).
Figure 6:
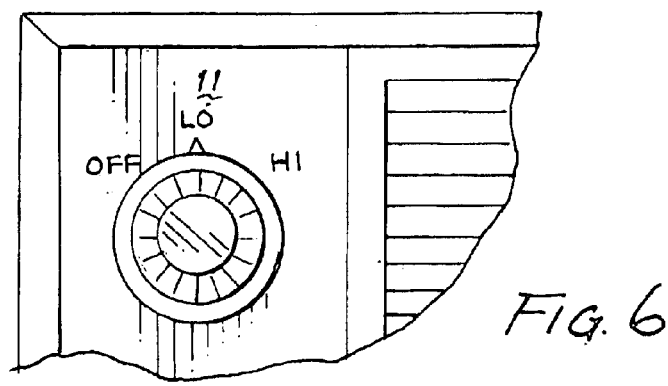
FIG. 6 is a front view of the fan switch for one of the evaporative coolers shown in FIG. 5.

FIGS. 4–6 show a method for providing the apparatus 110 for supporting and arranging cooling devices 1 along the outer wall 2 of a home by positioning at least two of the apparatus 110 (a third apparatus is shown in phantom lines and is used, if needed) along the outer wall 2 while spacing them optimally about three to seven feet from each other and positioning at least two evaporative coolers 8 respectively on the two corresponding apparatus 110, and setting the evaporative coolers 8 (one at a time) on a low setting 11 (see FIG. 6), so as to bring about an optimal cooling effect for the interior portion of the home. Preferably, first one evaporative cooler 8 is set in the low fan position 11 and then when the interior of the building or home gets too hot (about 80 degrees Fahrenheit), another evaporative cooler 8 is turned on and set at the low fan position 11. By using the evaporative coolers 8 in this manner, it has been discovered that the interior portion of a building or home may be optimally cooled by evaporative coolers even if the outside temperature is over 100 degrees Fahrenheit.

As shown in FIG. 6, the evaporative coolers 8 each have a fan switch 9 to select a fan speed level (between low and high) for each evaporative cooler 8. As described above, a user will turn the controls of at least two (one at a time) evaporative coolers 8 onto the low fan setting 11 to create a preferred cooled interior room temperature. If needed, the user will subsequently turn on the control of (one or more) additional evaporative coolers 12 (see FIG. 4 and FIG. 5) onto a low setting 11 as well. Although the evaporative coolers 8,12 are each on a low setting 11, they will work synergistically with the optimal spacing described above to create an optimal cooling effect inside the home.

Applicant's wall mounted array of evaporative coolers (using two evaporative coolers) for Applicant's 2300 square foot home only cost Applicant $1.20 per day in electricity usage during the approximately 6 cooler months in the Las Vegas, Nev. area which is about $36 per month versus an electricity usage cost of $1.77 per day during the approximately 6 hotter months which is about $57 per month (or only an increase of about 57 cents per day). Contrasted with the use of air conditioners versus Applicant's array of evaporative coolers, Applicant has achieved much greater savings in electricity costs. Additionally, Applicant's array of evaporative coolers which are operated in the manner disclosed herein and that are wall mounted with wall penetrating vents provides healthier (external) cooled filtered air that is humidified (versus dry recycled internal air from air conditioners) for an electricity cost of about one sixth the electricity cost of air conditioners thereby reducing the amount of oil, coal, etc. needed for electricity generation. Also, the costs of purchasing evaporative coolers are much less than the costs of purchasing air conditioners.

While the invention has been particularly shown and described with reference to preferred embodiments thereof, it will be understood by those skilled in the art that the foregoing and other changes in form and details may be made therein without departing from the spirit and scope of the invention.

I claim:

1. A method for cooling the interior of a building or home using evaporative coolers comprising the steps of:

coupling an output of one of at least two evaporative coolers into the interior of a building or home;

controlling the output of the one of the at least two evaporative coolers by placing its control fan on a low setting;

coupling an output of the other one of the at least two evaporative coolers each having multiple settings into the interior of the building or home when the temperature within the interior of the building or home becomes uncomfortable due to high external temperature; and controlling the output of the other of the at least two evaporative coolers by placing its controls on a low fan setting, the output of the one of the at least two evaporative coolers providing cooled air in the same but substantially parallel direction as the output of the other one of the at least two evaporative coolers, whereby an optimal cooling effect is created in the interior of the building or home.

2. The method of claim 1 including the step of turning on and controlling any additional evaporative cooler onto a low fan setting to create an optimal interior temperature.

3. The method of claim 1 wherein the output into the building or home of each of the at least two evaporative coolers is located within three to seven feet from the output of the other evaporative cooler.

4. The method of claim 3 wherein the output of any additional evaporative cooler into the building or home is located within three to seven feet from the closest adjacent evaporative cooler.

* * * * *